(12) United States Patent
Yoshida

(10) Patent No.: US 6,584,222 B2
(45) Date of Patent: Jun. 24, 2003

(54) FEATURE-REGION EXTRACTION METHOD AND FEATURE-REGION EXTRACTION CIRCUIT

(75) Inventor: Shigeo Yoshida, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/955,829

(22) Filed: Sep. 19, 2001

(65) Prior Publication Data

US 2002/0126908 A1 Sep. 12, 2002

Related U.S. Application Data

(62) Division of application No. 09/040,579, filed on Mar. 18, 1998, now Pat. No. 6,332,041, which is a division of application No. 08/675,810, filed on Jul. 5, 1996, now Pat. No. 5,748,776, which is a continuation of application No. 08/276,205, filed on Jul. 18, 1994, now abandoned.

(30) Foreign Application Priority Data

Jul. 19, 1993 (JP) .............................................. 5-178250
Dec. 22, 1993 (JP) .............................................. 5-323709

(51) Int. Cl.[7] .................................................. G06K 9/46
(52) U.S. Cl. ........................ 382/165; 358/538; 375/296
(58) Field of Search ................................ 382/100, 166, 382/232–238, 246, 165, 196, 195; 348/17, 391, 397; 358/133, 448, 538–539; 375/240, 296

(56) References Cited

U.S. PATENT DOCUMENTS

| | | | |
|---|---|---|---|
| 4,980,764 A | 12/1990 | Henot | 358/133 |
| 4,991,223 A | 2/1991 | Bradley | 382/17 |
| 5,046,119 A | 9/1991 | Hoffert et al. | 382/166 |
| 5,051,840 A | 9/1991 | Wantanabe et al. | 382/239 |
| 5,070,532 A | 12/1991 | Faul et al. | 382/166 |
| 5,212,742 A | 5/1993 | Normile et al. | 382/166 |
| 5,276,533 A | 1/1994 | Simizu et al. | 358/448 |
| 5,319,793 A | 6/1994 | Hancock et al. | 395/800 |
| 5,585,944 A | 12/1996 | Rodriguez | 382/166 |

(List continued on next page.)

OTHER PUBLICATIONS

H. Ueno, et al. "Brightness Compensation for Video Phones", in Visicom 1991 Picture Coding Symposium, Program & Papers, 00. 391–393, Sep. 2–4, 1991, Tokyo, Japan.

Plompen, et al., "An Image–Knowledge–Based Video Codec for Low Bitrates" (SPIE 87; The international Society for Opt. Eng) Apr. 3, 1987, The Hague, Netherlands, pp. 1–2.

(List continued on next page.)

*Primary Examiner*—Jayanti K. Patel
(74) *Attorney, Agent, or Firm*—Edwards & Angell, LLP; David G. Conlin, Esq.; Richard J. Ross, Esq.

(57) ABSTRACT

The present invention is intended to exactly extract a feature-region along its contour line without erroneously extracting any moving object other than the feature-region. An extraction signal from a feature-region main-portion extracting circuit is sent to a small region eliminating circuit whereby an erroneously extracted small region is detected and eliminated as an erroneously extracted noisy portion. The small region eliminating circuit compares a small region with four detection patterns, discriminates it as a region other than the feature (face)-region if no match is found and causes a center pixel of a window of 3×3 pixels to have a logical value of zero. An output of the small region eliminating circuit is sent to a blank filling circuit which compares its input with four detection patterns, discriminates it as a face-region if a match is found and makes a central pixel of a window of 13×13 pixels have a logical value of 1. The above-mentioned extraction method can reliably extract features of the face-region and is free from the erroneous extraction of any moving object other than the face.

3 Claims, 16 Drawing Sheets

U.S. PATENT DOCUMENTS

| | | | | |
|---|---|---|---|---|
| 5,594,494 | A | | 1/1997 | Okeda et al. .................. 348/17 |
| 5,596,362 | A | | 1/1997 | Zhou .......................... 382/118 |
| 5,751,856 | A | * | 5/1998 | Hirabayashi ................ 382/232 |
| 5,815,600 | A | * | 9/1998 | Sano et al. ................. 382/232 |
| 5,818,607 | A | * | 10/1998 | Nakamura et al. .......... 382/232 |
| 6,272,248 | B1 | * | 8/2001 | Saitoh et al. ............... 382/218 |
| 6,324,573 | B1 | * | 11/2001 | Rhoads ....................... 709/217 |
| 6,330,666 | B1 | * | 12/2001 | Wise et al. ................. 382/246 |

OTHER PUBLICATIONS

Turk, et al., "Eigenfaces for Recognition," M.I.T. Media Lab Vision and Modeling Group, Technical Report No. 154, Journal of Cognitive Neuroscience, vol. 3, No. 1, pp. 71–86, 1991.

Suwa, et al., "A Video Quality Improvement Technique for Videophone and Videoconference Terminal", IEEE Visual Signal processing and Communications Workshop Proceedings, pp. 315–318, Sep. 20–22, 1993.

Patent Abstracts of Japan, vol. 12, No. 420 (E–679), English Abstract of Nagashima/NTT Appln. No. 63–157593–A Published Jun. 1988.

Patent Abstracts of Japan, vol. 14, No. 381 (p–1093), English Abstract of Shomura/Guraf. Appln. No. 2–141880–A, Published May 1990.

Patent Abstracts of Japan, vol. 17, No. 369 (P–1572), English Abstract of Kanamori/Mats., Appln. No. 5–060616–A, Published Mar. 1993.

Yamamoto, et al., "Automatic Viewing Range Tracing Method for Communication Equipment", 8087 IEEE Transactions of Consumer Electronics, vol. 37,3,pp. 424–431, Aug. 1991.

H. Ueno, et al., "Color Motion Picture Coding Device Featuring Preferential Processing of a Face Image", Image Information, vol. 24, pp. 29–35, Mar. 1992.

* cited by examiner

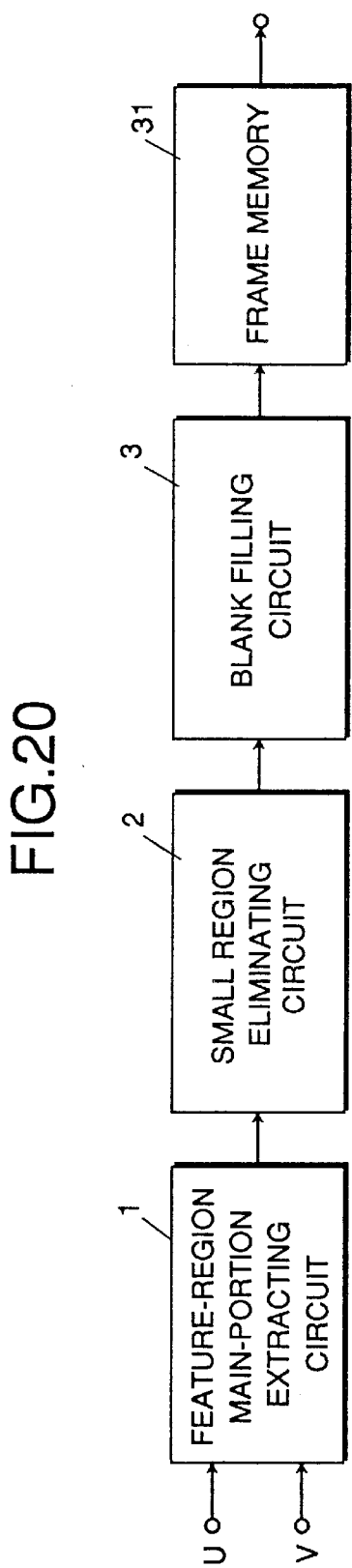

FIG.21

| WEIGHT COEFFICIENT EXAMPLE | $K_0$ | $K_1$ | $K_2$ | $K_3$ |
|---|---|---|---|---|
| (1) | 1 | 1 | 1 | 1 |
| (2) | 1 | 2 | 2 | 1 |
| (3) | 4 | 2 | 1 | 1 |

FIG.22

| | H → | |
|---|---|---|
| 1 | P | 1 |
| P | $P^2$ | P |
| 1 | P | 1 |

| FEATURE-REGION EXTRACTION SIGNAL | 0 | 1 |
|---|---|---|
| P | 1 | 8 |
| ΔQ | +10 | 0 |

FIG.23B

| FEATURE-REGION EXTRACTION SIGNAL | 0 | 1 | 2 | 3 | 4 |
|---|---|---|---|---|---|
| P | 1 | 2 | 4 | 8 | 8 |
| ΔQ | +10 | +5 | +2 | 0 | 0 |

FEATURE-REGION EXTRACTION METHOD AND FEATURE-REGION EXTRACTION CIRCUIT

This application is a divisional of U.S. Patent application ser. No. 09/040,579 filed Mar. 18, 1998 now U.S. Pat. No. 6,332,041, which is a divisional of U.S. patent application Ser. No. 08/675,810 filed Jul. 5, 1996, now U.S. Pat. No. 5,748,776, which is a continuation of U.S. patent application Ser. No. 08/276,205 filed Jul. 18, 1994, now abandoned.

BACKGROUND OF THE INVENTION

The present invention relates to a feature-region extraction method and a feature-region extraction circuit and, more particularly, to a feature-region extraction method and a feature-region extraction circuit which are capable of extracting a feature-region of an image for processing the image according to its feature at a pre-processing portion of an image coding device and which are intended to be used, for example, in video telephone systems, video conference systems and so on.

At a motion picture coding and transmitting device for a video telephone, since any transmission line has a limited or finite capacity to transmit a number of bits at a time, it cannot allocate enough bits to an image information. Accordingly, a decoded image may have an impaired picture quality with a mosquito-like distortion, a block distortion and the like. On the other hand, most of the images to be transmitted include an important portion and less important portions. On the basis of this fact, a method is proposed that reduces the subjective deterioration of an image quality by keeping the important portion free from the ill effects of deterioration.

For example, in systems such as video telephone systems, the image of the face region is so important that such systems have been directed toward extracting the face region, preferentially allocating the amount of information transmitted and making the image quality of the face region better, aiming at improvement of the subjective image quality.

The prior art that is concerned with the present invention is disclosed in the publication "Color motion picture coding device featured by preferentially processing a face image" (Hideyuki Ueno, Image Information vol. 24, March 1992, pp. 29–35). The face-region extraction method of the prior art described in the publication will be explained as follows.

The prior art first determines the difference between two neighboring frames of the motion picture inputted to get the interframe differential image and then divides the interframe differential image into rectangular regions. In the respective rectangular regions, the method makes a histogram representing the number of pixels, in which the interframe difference signal is larger than a certain threshold, on an H-axis. The method scans the histogram from the left to right, comparing its values with a certain threshold "th" to detect the left and right ends of the moving region.

The image screen is scanned from the upper left end until a first moving region is found. This moving region has a coordinate on a V-axis, which represents a position at the top of one's head. The image screen is then scanned from the left and the right by a certain range of lower image to determine the left and right ends of the moving region. And then, the outermost positions of the moving region on the H-axis represent the coordinates of the left and right ends of the face. The face length is determined by multiplying the face width by a predetermined coefficient "α". The prior art considers the thus determined image region as a face-region.

As mentioned above, the conventional feature-region extracting method estimates a face-region from an interframe difference signal representing the amount of motion. Consequently, if the image includes any other moving object than the face-region, the prior art method may erroneously take the object as a face part. Furthermore, the method can roughly extract a face-region only in the form of a rectangle, which contour may be emphasized when the regions other than the face are adaptively processed with a low-pass filter. This may impair the subjective image quality.

SUMMARY OF THE INVENTION

It is an object of the present invention to provide a feature-region extraction method and the feature-region extraction circuit, which can extract a feature-region exactly along its contour without erroneously extracting any other moving object than the feature one, thereby allowing adaptive processing of portions other than the feature-region without impairing the image quality and can extract a face-region, using color difference components, regardless of the movement and location of a person or a number of persons, improving the subjective image quality.

It is another object of the present invention to provide a feature-region extraction method whereby a small color difference region including a feature color difference component of a feature-region is located within a color difference coordinate system defined by two axes representing two respective color difference signals and an image region, which has a color difference component in the small color difference region mentioned above, is extracted as a feature-region; the small color difference region can take any desired form thereby eliminating the possibility of erroneously extracting any moving object other than the feature-region; the feature-region can be exactly extracted along its contour line to make the image more natural and to have a subjectively improved quality and, therefore, can withstand adaptive processing of other regions with a low-pass filter; and, furthermore, only color difference signals are applied for feature-region extraction to prevent erroneous extraction when the luminance level of the feature-region varies in space and in time.

It is another object of the present invention to provide a feature-region extraction method whereby a small color difference region is a common region of two color difference signals binarized by the use of specified thresholds and a feature-region is easily extracted therefrom.

It is another object of the present invention to provide a feature-region extraction method whereby a feature-region is extracted from a plurality of small color difference regions so as to further improve the image quality.

It is another object of the present invention to provide a feature-region extraction method whereby a feature-region along its contour line is extracted together with a dropout region enclosed within the feature-region contour line, so as to further improve the image quality.

It is another object of the present invention to provide a feature-region extraction method whereby a feature-region is extracted from a common region of two color difference signals binarized by the use of specified thresholds and dropout regions within the feature-region are filled up by using detection patterns weighted by distance so as to further improve the image quality.

It is another object of the present invention to provide a feature-region extraction method whereby in extracting a feature-region by using means for extracting a feature-region and a memory means for storing a feature-region extraction signal, a criterion is given a hysteresis characteristic depending upon whether a pixel backed by L frames (L is a positive integer) and/or its neighbor pixel is a feature-region or not, making it possible to effectively prevent the feature-region from being extracted with flickers and thereby to further improve the subjective image quality.

It is another object of the present invention to provide a feature-region extraction method whereby a feature-region is extracted by using its characteristic, and feature-region extraction signals of plural frames from a memory of M frames (M is a positive integer) are weighted for extracting a weighted feature-region so as to further improve the image quality.

It is another object of the present invention to provide a feature-region extraction circuit whereby a feature-region extraction circuit that includes a means for extracting a main portion of a feature-region and for filling a dropout region can extract a feature-region exactly along its contour line, and thereby adaptive processing of an image region other than the featured one with a low-pass filter can be performed free from the image deterioration.

A feature-region extracting method, according to the present invention, can extract a feature-region by using a small color difference region including a feature color difference component of a feature-region within a color difference coordinate system having two axes representing two respective color difference signals, eliminating the possibility of erroneously extracting any other moving object than the feature-region. Furthermore, the method is capable of exactly extracting a feature-region along its contour, allowing adaptive processing with a low-pass filter to improve the subjective image quality without emphasizing the extracted region's contour. It binarizes two color difference signals by use of specified thresholds to produce a common region and extracts therefrom a feature-region without erroneously extracting any other moving object than the feature-region.

According to the present invention, a feature-region can be extracted from a plurality of small color difference regions including a feature color difference component of a feature-region, and no other region than the featured one can be extracted even in the case when feature color difference components are widely dispersed within a color difference coordinate system having two axes representing two color difference signals.

In addition, since a feature-region can be correctly extracted along its contour line, it is possible to apply any adaptive processing such as pre-filter processing, which is a low-pass filter processing controlled by an extracted signal, or a quantizing control for roughening the step-size of the quantization of a background region to improve the subjective image quality without unnaturally emphasizing the contour line of the extracted feature-region.

To realize the above-mentioned purposes, the present invention was made to provide:

(1) A feature-region extracting method which determines a small color difference region including a feature color difference component of a feature-region within a color difference coordinate system defined by two axes of two color difference signals and which extracts an image region that has a color difference component within a small color difference region mentioned above as a feature-region;

(2) A means to make a small color difference region be a common region having two color difference signals binarized by certain thresholds and which extracts a feature-region therefrom;

(3) A means to extract a feature-region from a plurality of small color difference regions (in addition to item (1) or (2)); or (4) A means to extract a feature-region along its contour line together with a dropout region enclosed within the contour line of the feature-region as a feature region; or (5) A means to binarize two color difference signals of an image by certain thresholds, extract a feature-region from the common region of the binarized color difference signals and detect patterns for blank filling which are suitably weighted according to the distance for filling up the dropout region; or (6) A means to provide a criterion with an hysteresis characteristic depending upon whether a pixel backed by L frames (L is a positive integer) and/or an adjoining one relating to a feature-region or not and uses it when extracting a feature-region by using a means for extracting the feature-region and a memory means for storing a feature-region extraction signal; or (7) A means to extract a feature-region by using its characteristic, generate output signals of feature-region extraction of frames from a memory of M frames (M is a positive integer) and make the frame feature-region extraction signals weighted to extract a weighted feature-region; or (8) A feature-region extraction circuit which comprises a feature-region main-portion extracting circuit for extracting an image region having a feature color difference component of a feature-region and a blank filling circuit for filling up a dropout region which is sandwiched in between the feature-region and which has a different color difference component other than the featured one; and further, (9) A means to include the feature-region main-portion extracting circuit which comprises a comparison circuit for comparing two color difference signals with the upper limit threshold and the lower limit threshold, and an AND gate circuit for determining the logical product of outputs of the comparison circuit and extracting a common region; and further,

(10) A means to include another feature-region main-portion extracting circuit which comprises a first comparison circuit for comparing two color difference signals with a first upper limit threshold and a first lower limit threshold, a first AND gate circuit for determining a logical product of outputs of the first comparison circuit and extracting a common region, a second comparison circuit for comparing two color difference signals to a second upper limit threshold and a second lower limit threshold, a second AND gate circuit for determining a logical product of outputs of the second comparison circuit and extracting a common region and an OR gate circuit for determining a logical sum of the first comparison circuit's output and the second comparison circuit's output and extracting feature regions distributed among a plurality of regions.

BRIEF DESCRIPTION OF DRAWINGS

FIG. 20 shows another example of a feature-region extraction circuit according to the present invention;

FIG. 21 shows weight coefficients according to the present invention;

FIG. 22, shows coefficients of a pre-filter according to the present invention; and FIGS. 23A and 23B show variables of adaptive control according to the present invention.

PREFERRED EMBODIMENT OF THE INVENTION

Figure 1A:
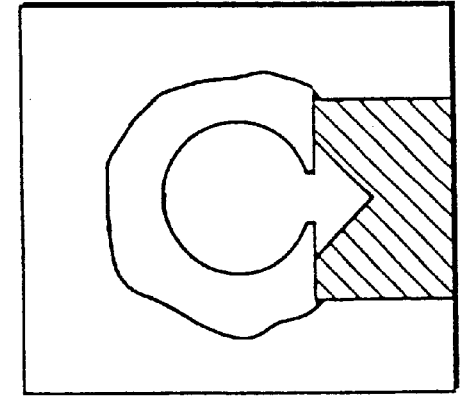
FIGS. 1A, 1B and 1C show a diagram for explaining an interframe difference according to the prior art.
Figure 1B:
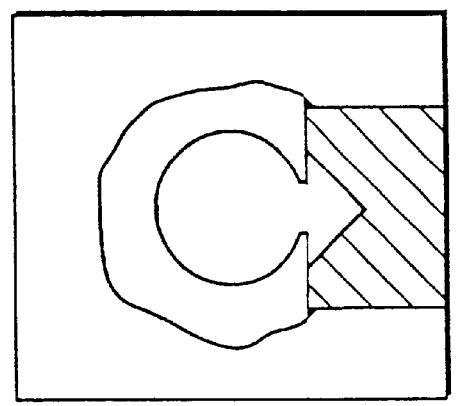
Figure 1C:
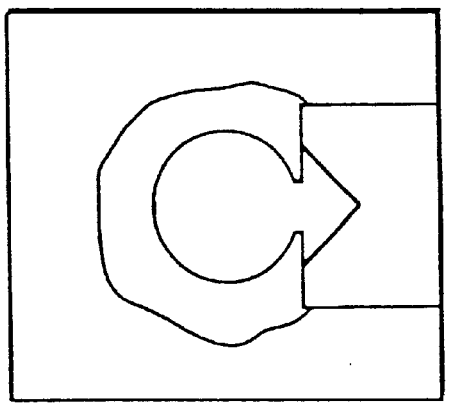
Figure 2B:
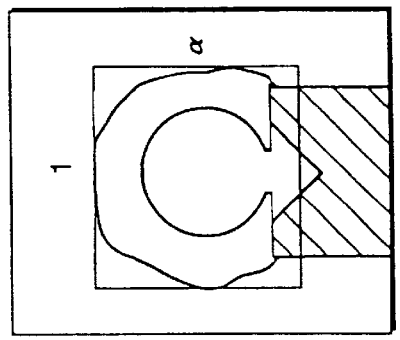
FIGS. 2A, and 2B are a diagram for explaining a conventional method for plotting a histogram.
Figure 3B:
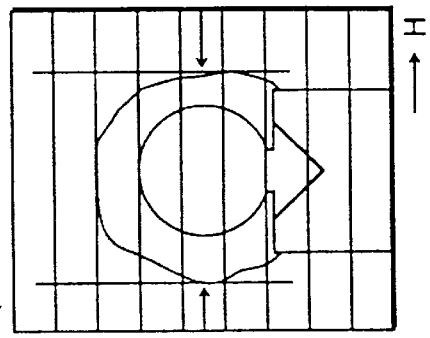
FIGS. 3A, 3B and 3C are a diagram for explaining a conventional face-region extraction.
Figure 3C:
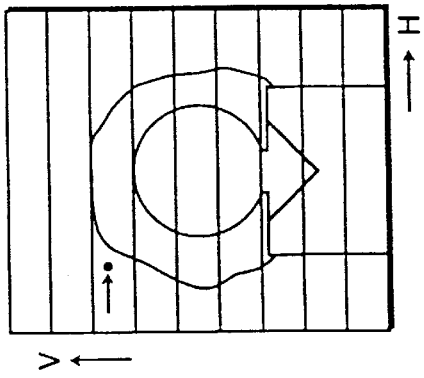
Figure 2A:
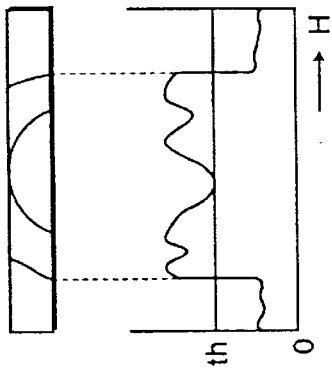
Figure 3A:
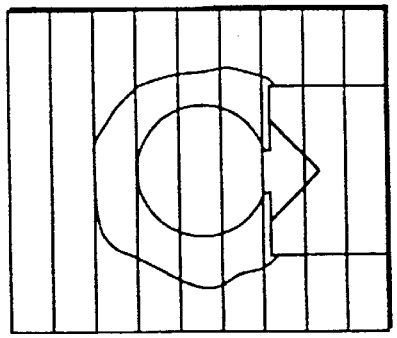

FIGS. 1A to 1C are diagrams for explaining a conventional interframe difference signal, FIGS. 2A and 2B are diagrams for explaining a conventional histogram plotting method and FIGS. 3A to 3C are diagrams for explaining a conventional face-region extracting method.

The prior art first determines the difference signal between two neighboring frames (frame N shown in FIG. 1A and frame N+1 shown in FIG. 1B) of the motion picture inputted to get the interframe differential image shown in FIG. 1C and then divides the interframe differential image into rectangular regions as shown in FIG. 2A. In the respective rectangular regions, the method makes a histogram representing the number of pixels, in which the interframe difference signal is larger then a certain threshold, on an H-axis as shown in FIG. 2B. The method scans the histogram from the left to right, comparing its values with a certain threshold "th" to detect the left and right ends of the moving regions.

As shown in FIG. 3A, the image screen is scanned from the upper left end until a first moving region is found. This moving region has a coordinate on a V-axis, which represents a position at the top of one's head. The image screen is then scanned from the left to right by a certain range of lower image to determine the left and right ends of the moving region as shown in FIG. 3B. And then, the outermost positions of the moving region on the H-axis represent the coordinates of the left and right ends of the face. The face length is determined by multiplying the face width by a predetermined coefficient "α" as shown in FIG. 3C. The prior art considers the thus determined image region as a face-region.

As mentioned above, the conventional feature-region extracting method estimates a face-region from an interframe difference representing the amount of motion. Consequently, if the image includes any other moving object than the face-region, the prior art method may erroneously take the object as a face part. Furthermore, the method can roughly extract a face-region only in the form of a rectangle, which contour may be emphasized when the regions other than the face are adaptively processed with a low-pass filter. This may impair the subjective image quality.

Figure 4:
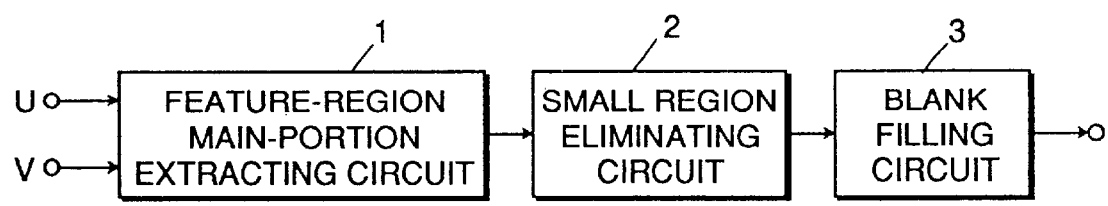
FIG. 4 is a block diagram for explaining a feature-region extraction circuit embodied in the present invention.

Referring now to the accompanying drawings, preferred embodiments of the present invention will be described in detail as follows:

FIG. 4 is a block diagram for explaining an embodiment (1) of a feature-region extracting circuit according to the present invention, which comprises a feature-region main-portion extracting circuit 1, a small region eliminating circuit 2 and a blank filling circuit 3. The feature-region main-portion extracting circuit 1 extracts an image region, including therein a feature color difference component of a feature-region and passes the extraction signal to a small region eliminating circuit 2 whereby a small region is eliminated as a portion erroneously extracted by the effect of noise or the like. The output signal from the small region eliminating circuit 2 is passed to the blank filling circuit 3 which fills up a dropout region which has a color difference component other than the featured one and then produces a feature-region extraction signal.

Figure 5:
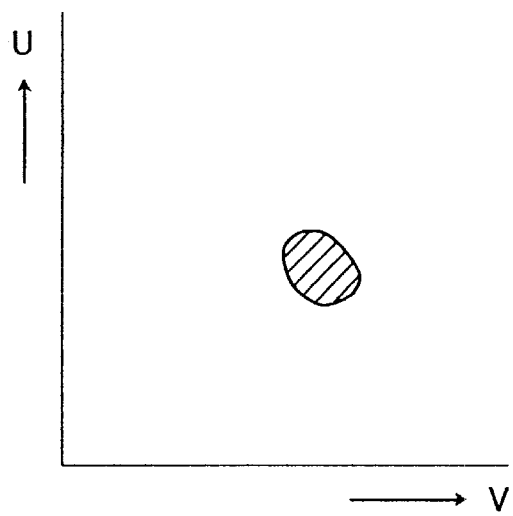
FIG. 5 is a diagram (1) for explaining the distribution of the skin-color of a person, according to the present invention.
Figure 6:
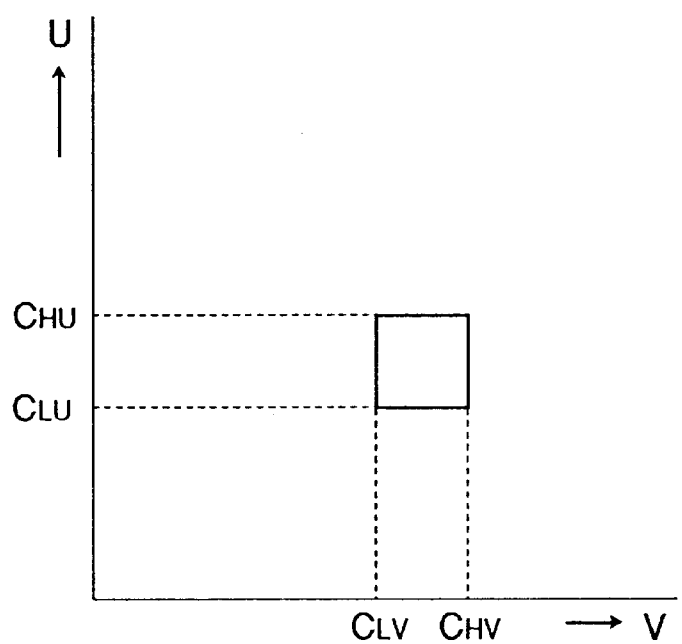
FIG. 6 is a diagram (2) for explaining the distribution of the skin-color of a person, according to the present invention.

The present invention provides a method for extracting a face-region, utilizing the characteristic that skin-color components occupying most of one's face-region as shown in FIG. 5, concentrate on a small color difference region (hatched portion) within the color difference region defined by a coordinate system indicating a U-signal level on a vertical axis and a V-signal level on a horizontal axis. As shown in FIG. 6, the small color difference region is made a common region by binarizing two color difference signals of an image through the specific thresholds and then extracting a face-region therefrom. In short, this method is made to extract a face-region on the basis that its feature (skin) color is apt to concentrate on a small color difference region (enclosed by, line segments $C_{HU}$, $C_{LU}$, $C_{HV}$, $C_{LV}$) within a coordinate system indicating a U-signal level on a vertical axis and a V-signal level on a horizontal axis.

Figure 7:
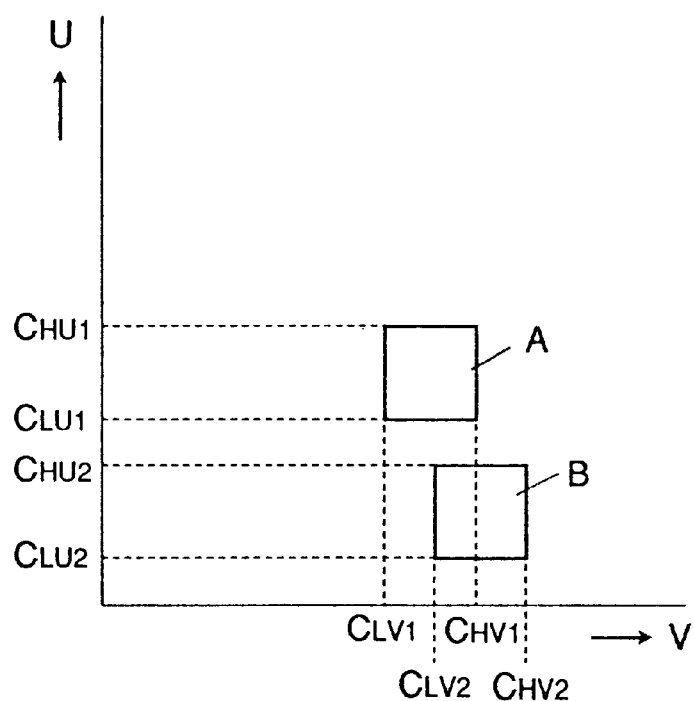
FIG. 7 is a diagram (3) for explaining the distribution of the skin-color of a person, according to the present invention.

Even if the skin color that occupies most of a human face-region is distributed among a plurality of small color difference regions (e.g. the area A enclosed by line segments $C_{HU1}$, $C_{LU1}$, $C_{HV1}$, $C_{LV1}$ and an area B enclosed by line segments $C_{HU2}$, $C_{LU2}$, $C_{HV2}$, $C_{LV2}$ as shown in FIG. 7) within a coordinate system indicating a U-signal level on a vertical axis and a V-signal level on a horizontal axis as shown in FIG. 7, it is possible to extract the face-region exactly without error. Indeed, since human skin color components may be distributed among a plurality of small color difference regions of, e.g., whitish, blackish or any other hue, it is desirable to extract a face-region by the method of the present invention.

Figure 8:
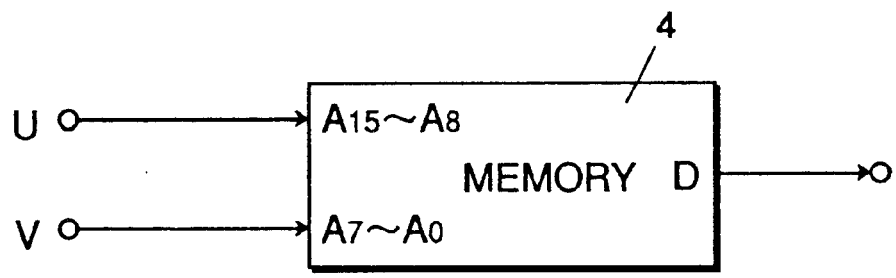
FIG. 8 is a diagram showing an example of a circuit for extracting the main portion of a feature-region according to FIG. 4.

FIG. 8 shows an example of the feature-region main-portion extracting circuit shown in FIG. 4, which uses a memory 4 for implementing the feature-region extracting method shown in FIG. 5.

The feature-region main-portion circuit 1 extracts a skin-color region occupying the major portion of one's face-region. This circuit 1 can be composed of a memory 4 such as a random access memory, a read-only memory and so on. The memory 4 stores two color difference signals U and V which are connected to its addresses A15–A8 and A7–A0 respectively. In the memory space represented by 16-bit addresses, one area corresponding to the hatched region of FIG. 5 is filled with the digit 1 (logical one) and other regions are filled with the digit 0 (logical zero). Accordingly, an output D of the memory 4 is 1 when the signals U and V are signals of a skin-color region corresponding to the hatched region shown in FIG. 5, and changes to 0 when the signals U and V relate to a region other than the face's. The main portion of a face-region can be thus extracted. However, a face-region extracted at this step lacks the regions such as the eyes, the eyebrows and the lips, differing in color from the skin-color portion. Furthermore, it may also include a region or regions other than the face-region, which were erroneously extracted because of noise or the like.

Figure 9:
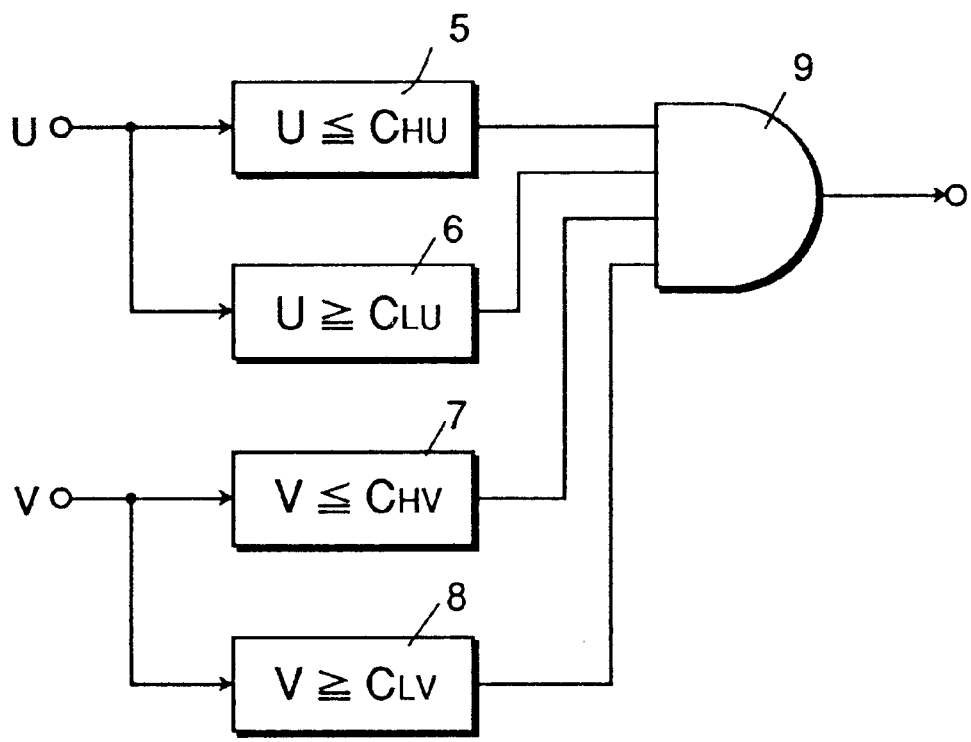
FIG. 9 is a diagram showing another example of a circuit for extracting the main portion of a feature-region according to FIG. 4.

FIG. 9 shows another example of a feature-region main-portion extracting circuit shown in FIG. 4, which is composed of comparison circuits 5 to 8 and an AND gate circuit 9 to implement the feature-region extraction method shown in FIG. 6.

The comparison circuits 5 to 8 compare two color difference signals (U and V) with the upper and lower limit thresholds $C_{HU}$, $C_{LU}$, $C_{HV}$, $C_{LV}$. The comparison circuit 5 provides an output signal having the logical value of 1 when $U \leq C_{HU}$. Similarly, the comparison circuits 6 to 8 provide output signals having a logical value of 1 respectively when $U \geq C_{LU}$, $V \leq C_{HV}$ and $V \geq C_{LV}$. Output signals of these comparison circuits 5 to 8 are passed to the AND gate circuit 9 which provides a logical product of the output signals, extracting therefrom a common region. Consequently, the output of the AND gate circuit includes the logical value of 1 for the skin-color region enclosed by line segments $C_{HU}$, $C_{LU}$, $C_{HV}$, $C_{LV}$ shown in FIG. 6. A main portion of a face-region can be thus extracted, but it lacks the regions such as the eyes, the brows and the lips, differing in color from the skin-color portion and may also include a region or regions other than the face-region, which were erroneously extracted because of a noise or the like.

Figure 10:
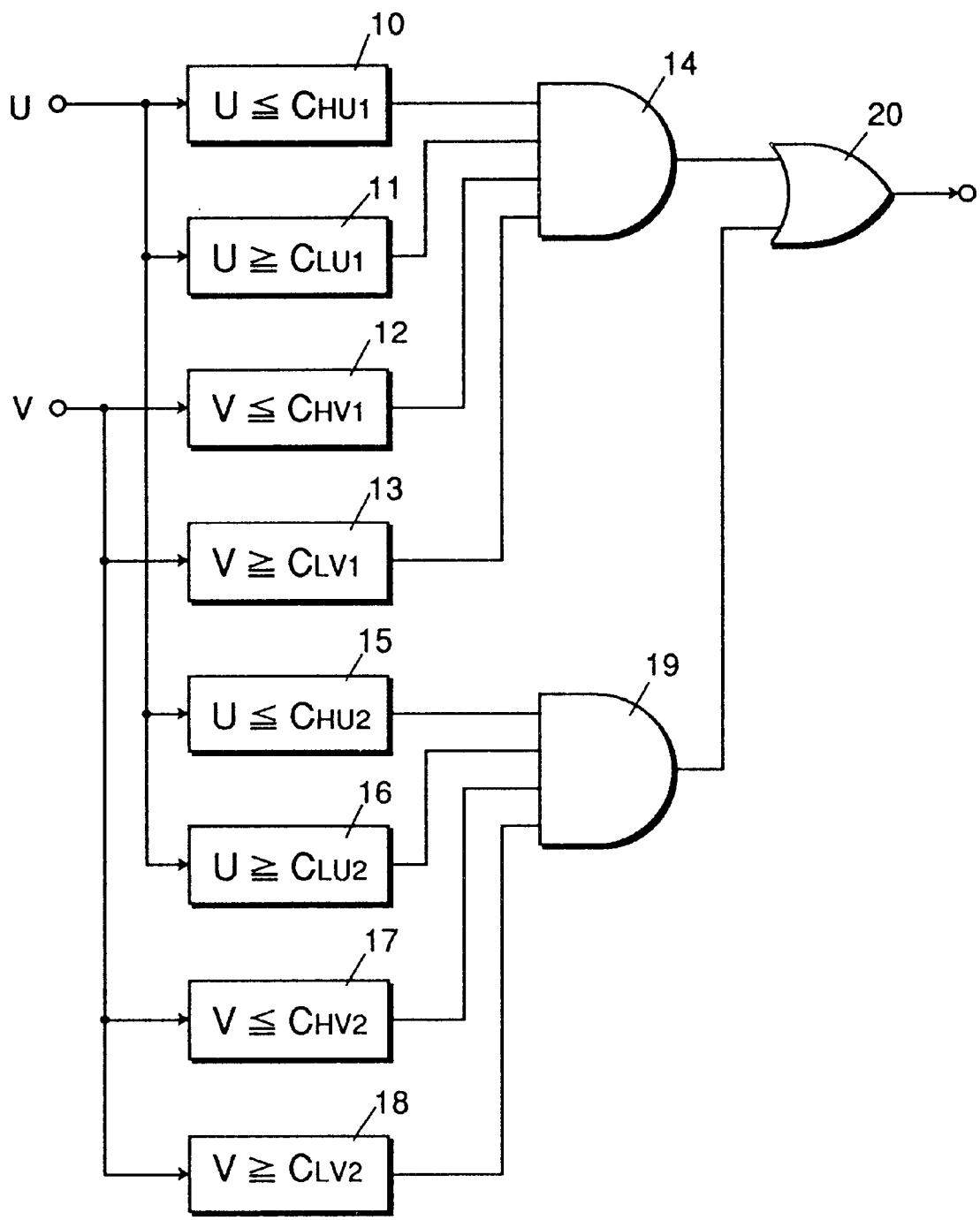
FIG. 10 is a diagram showing a further example of a circuit for extracting the main portion of a feature-region according to FIG. 4.
Figure 11A:
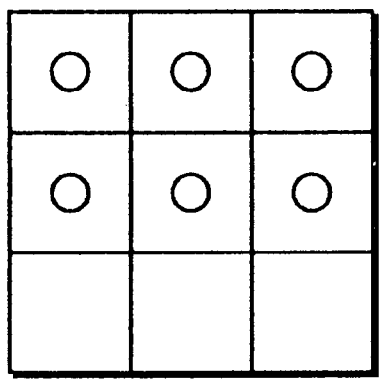
FIGS. 11A, 11B, 11C and 11D show a small region eliminating detection pattern (1), according to the present invention.
Figure 11B:
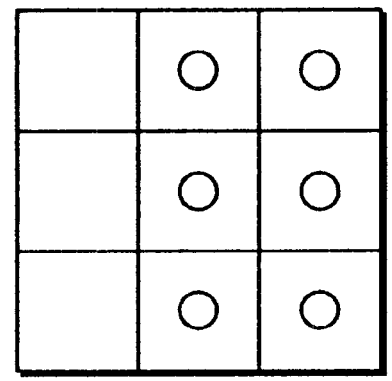
Figure 11C:
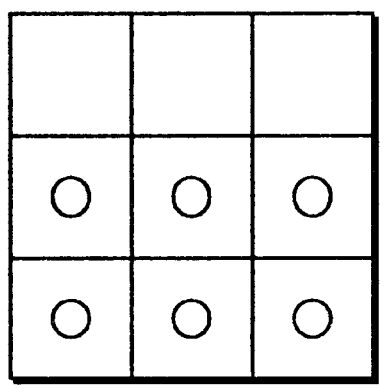
Figure 11D:
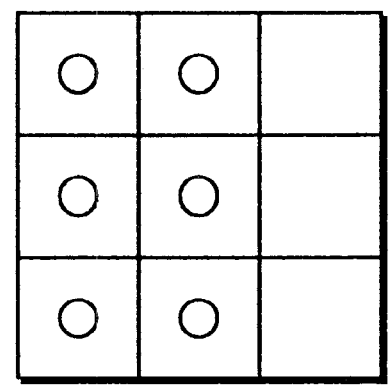
Figure 12A:
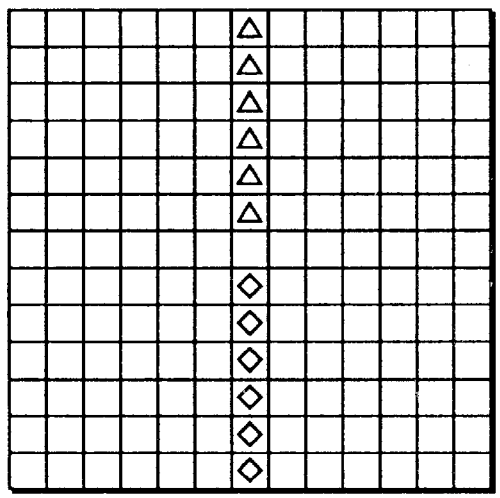
FIGS. 12A, 12B, 12C and 12D show detection patterns (1) for blank filling, according to the present invention.
Figure 12B:
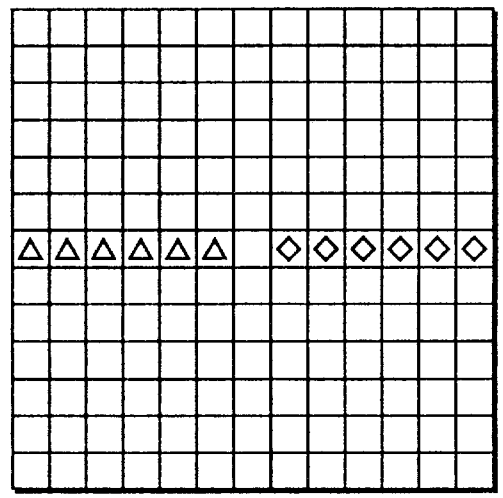
Figure 12C:
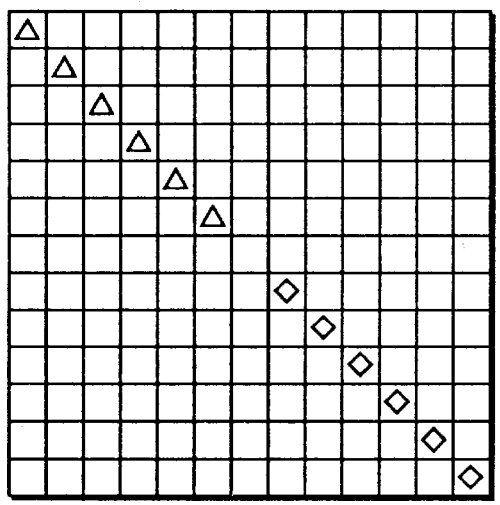
Figure 12D:
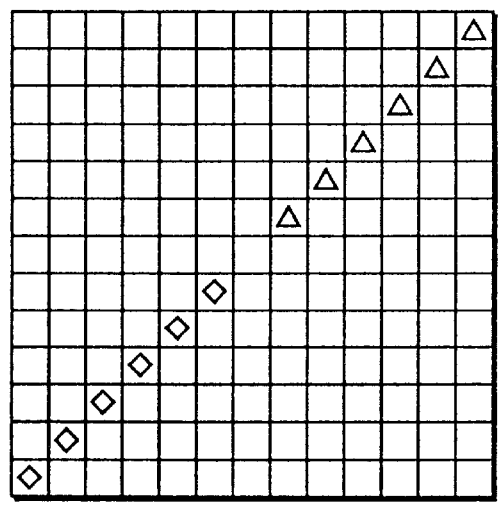

FIG. 10 illustrates a further example of a feature-region main-portion extracting circuit shown in FIG. 4, which is composed of comparison circuits 10 to 13 (for comparing with first upper and lower limit thresholds), a first AND gate circuit 14, comparison circuits 15 to 18 (for comparison with second upper and lower limit thresholds), a second AND gate, circuit 19 and an OR gate circuit 20 to implement the feature-region extraction method shown in FIG. 7.

The comparison circuits 10 to 13 compare two color difference signals (U and V) with upper and lower limit thresholds $C_{HU2}$, $C_{LU2}$, $C_{HV2}$, $C_{LV2}$. The comparison circuit 10 provides an output signal of a logical value of 1 when $U \leq C_{HU1}$. Similarly, the comparison circuits 11 to 13 provide output signals of the logical value of 1 respectively at $U \geq C_{LU1}$, $V \leq C_{HV1}$ and $V \geq C_{LV1}$. The comparison circuits 15 to 18 compare two color difference signals (U and V) with upper and lower limit thresholds $C_{HU2}$, $C_{LU2}$, $C_{HV2}$, $C_{LV2}$. The comparison circuit 15 provides an output signal of a logical value of 1 when $U \leq C_{HU2}$. Similarly, the comparison circuits 16 to 18 provide output signals of the logical value of 1 respectively at $U \geq C_{LU2}$, $V \leq C_{HV2}$ and $V \geq C_{LV2}$. Output signals of the comparison circuits 10 to 13 are passed to the first AND gate circuit 14 which provides a logical product of the output signals, extracting a common region. Output signals of the comparison circuits 15 to 18 are passed to the second AND gate circuit 19 which provides a logical product of the output signals, extracting therefrom a common region.

The outputs of the AND gate circuits 14 and 19 are passed to the OR gate circuit 20 which provides a logical sum of the outputs. Consequently, the output of the OR gate circuit 20 is a logical value of 1 for both the feature-region A enclosed by line segments $C_{HU1}$, $C_{LU1}$, $C_{HV1}$ and $C_{LV1}$ and the feature-region B enclosed by line segments $C_{HU2}$, $C_{LU2}$, $C_{HV2}$ and $C_{LV2}$ as shown in FIG. 7. The main portion of a face-region can thus be extracted with no error even if an attribute of a feature-region is distributed among a plurality of regions within a coordinate system indicating a U-signal level on a vertical axis and a V-signal level on a horizontal axis. However, the face-region extracted at this step lacks the regions such as the eyes, the eyebrows and the lips, differing in color from the face's skin-color portion and may also include a region or regions other than the face-region which were erroneously extracted because of a noise or the like.

Therefore, the extraction signal from the feature-region main-portion extracting circuit 1 enters the small region-eliminating circuit 2 (shown in FIG. 4) which identifies a small region erroneously detected and eliminates it, as a region detected due to the effect of noise. This circuit compares a feature-region signal with each of four detection patterns shown in FIGS. 11A to 11D and gives a logical value of 0 to the center pixel of a window of 3×3 pixels as a region other than the face when no match is found. A center pixel is judged to be a face-region when a logical product of 6 pixels (○:circle) shown in a circular form is 1 in each detection pattern.

Figure 13A:
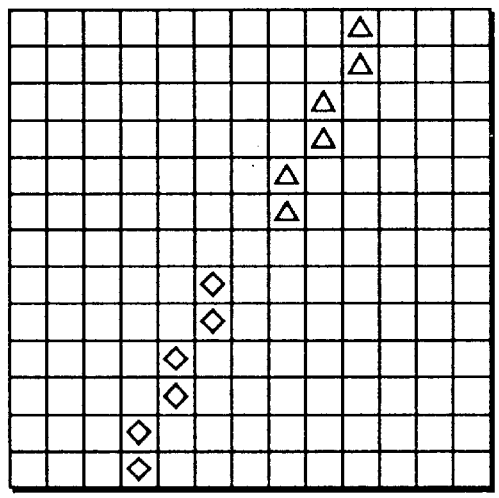
FIGS. 13A, 13B, 13C and 13D show detection patterns (2) for blank filling, according to the present invention.
Figure 13B:
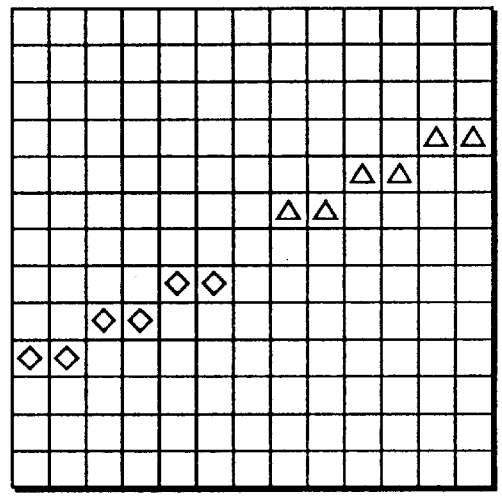
Figure 13C:
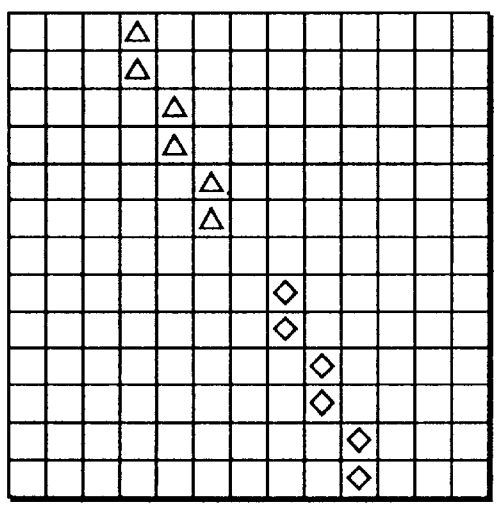
Figure 13D:
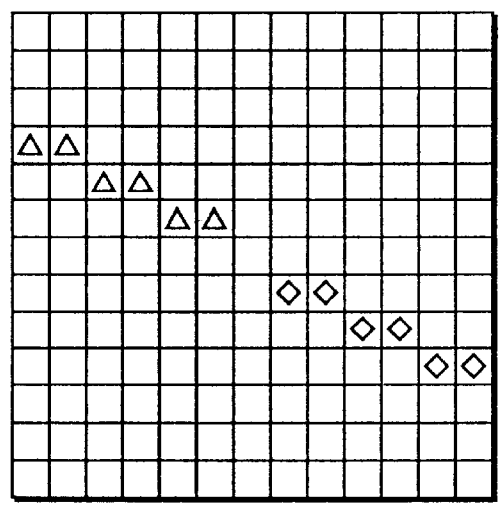
Figure 14A:
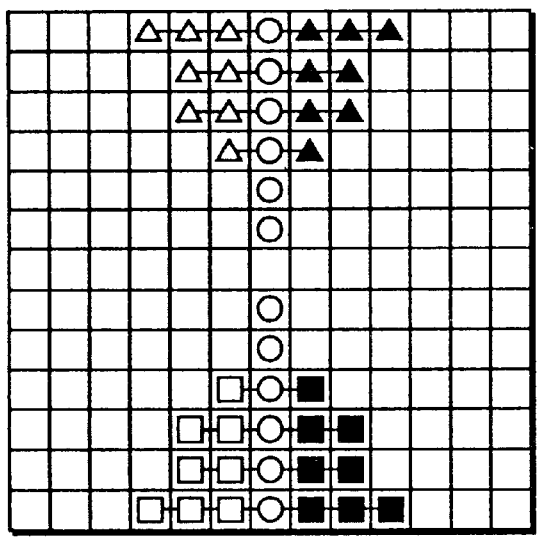
FIGS. 14A, 14B, 14C and 14D show detection patterns (3) for blank filling, according to the present invention.
Figure 14B:
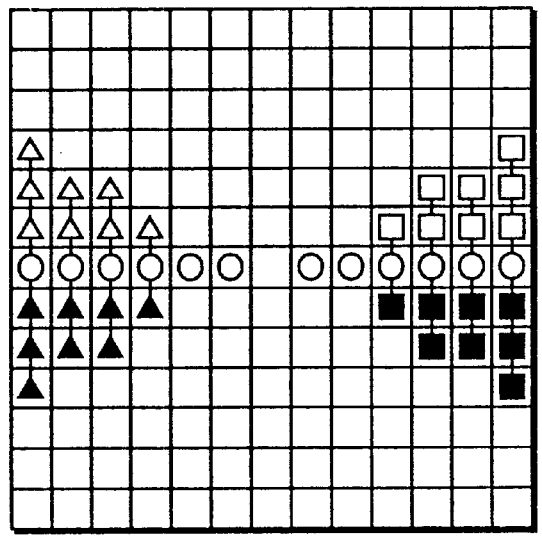
Figure 14C:
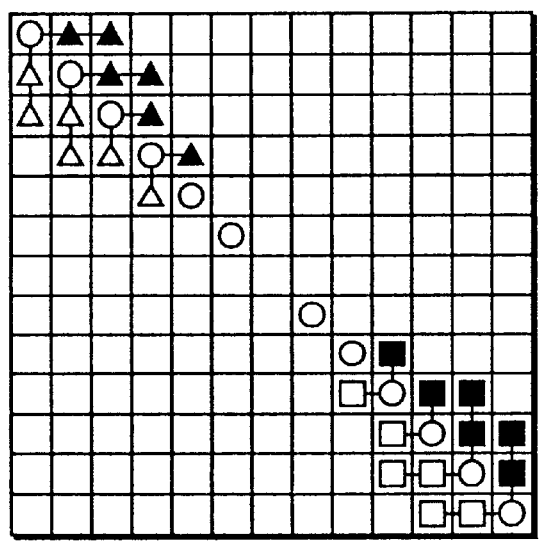
Figure 14D:
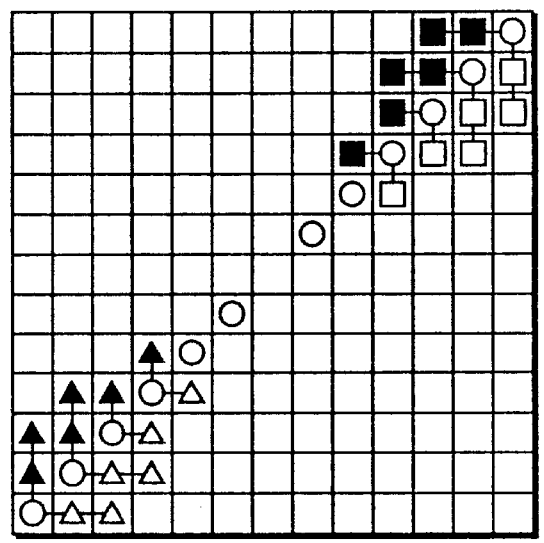
Figure 15A:
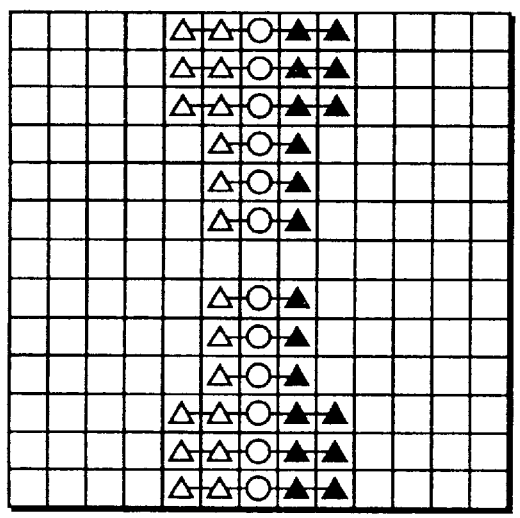
FIGS. 15A, 15B, 15C and 15D show detection patterns (4) for blank filling, according to the present invention.
Figure 15B:
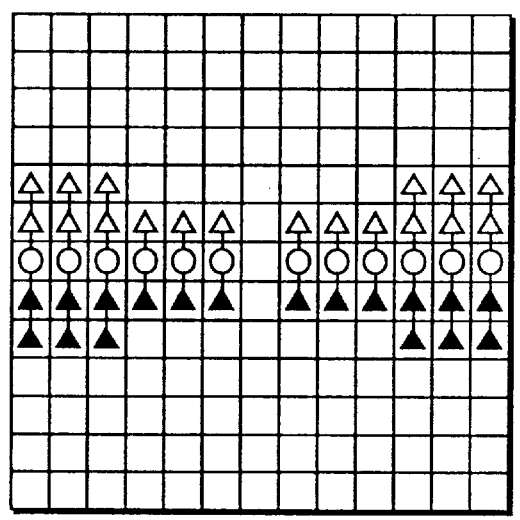
Figure 15C:
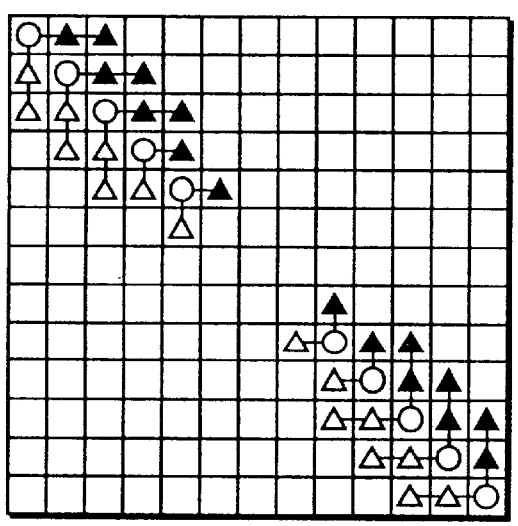
Figure 15D:
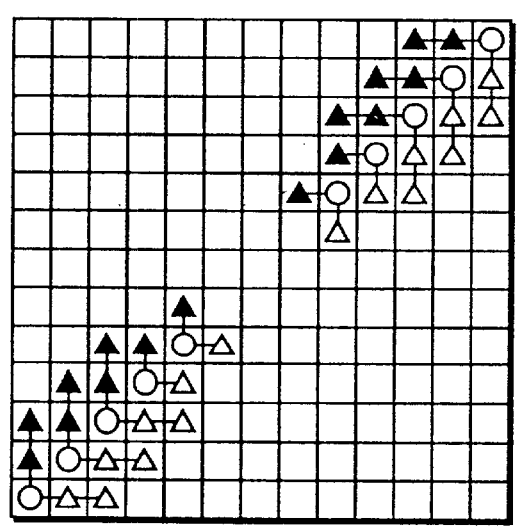

The output signal from the small region eliminating circuit 2 is passed to the blank filling circuit 3 which compares its input signal with each of four detection patterns shown in FIGS. 12A to 12D and gives a logical value of 1 to a center pixel of a window of 13×13 pixels as a face-region when a match is found. A center pixel is judged as a face-region when both logical sums of 6 pixels (▿:triangles) and 6 pixels (◇:diamonds) are 1 in each detection pattern. Detection patterns other than those shown in FIGS. 12A to 12D may be used if they have a similar effect. For example, patterns shown in FIGS. 13A to 13B are applicable as detection patterns. Furthermore, it is possible to use both of these detection patterns (8 patterns) in such a way that the logical value of 1 is given to a center pixel of a window when a signal pattern matches any one of the eight detection patterns.

The above-mentioned face-region extraction method can prevent erroneous extraction of any moving object other than the face-region and extract the face-region exactly along its contour line, making it possible to adaptively process any other region than the face through the face-region extraction signal, e.g., with a low-pass filter without unnaturally emphasizing the contour lines of the face-region and thereby not impairing the subjective image quality.

Although the above-described embodiment of the present invention performs the extraction of a face-region, it is also capable of extracting any feature-region other than the face by changing thresholds for color difference signals. The present invention also provides the possibility to extract a feature-region by using a luminance signal in combination with color difference signals or by using color signals R, G, B and so on. In addition, windows having sizes other than 3×3 and 13×13 are also applicable to performing the process to eliminate erroneously extracted small regions and to fill dropout regions with the same effect. The present invention can also provide a feature-region extraction method that does not include the small region eliminating circuit but assures a like effect.

As described above, the present invention provides a feature-region extraction method whereby a small color difference region having a feature color difference component of a feature-region of an image is located within a color difference coordinate system defined by two axes representing two color difference signals and an image region that has a color difference component within a small color difference region mentioned above is then extracted as a feature-region. In case the feature-region includes a portion having another color difference signal than the featured one, the extracted feature-region includes therein dropout regions that, however, can be filled in to produce a complete feature-region. The blank filling circuit 3 compares the feature extraction signal with each of four detection patterns shown in FIGS. 14(a) to 14(d) and classifies a center pixel of a window of 13×13 pixels as a feature-region and gives it a logical value of 1 when a match is found. In each detection pattern, a logical product of pixels shown in the form of a triangle (△) and a circle (○) (logical product (1)), a logical product of pixels shown in the form of a black triangle ( ) and a circle(○) (logical product (2)), a logical product of pixels in the form of a square (□) and a circle (○) (logical product (3)) and a logical product of pixels shown in the form of a black square (■) and a circle (○) (logical product (4)) are first determined for each solid line, then a logical sum (1) of the logical products (1) and the logical products (2) of all lines is determined, a logical sum (2) of the logical products (3) and the logical products (4) of all lines is determined and a logical product of the logical sum (1) and the logical sum (2) is finally calculated. A center pixel of the window of 13×13 pixels is judged as a feature-region if the result of the final logical operation is 1.

Detection patterns other than those shown in FIGS. 14A to 14D are also used with the similar effect. For example, detection patterns shown in FIGS. 15A to 15D may be applied. A center pixel of a window of 13×13 pixels is classified as a feature-region having a logical value of 1 when the feature-region extraction signal matches any one of these four detection patterns. In each detection pattern, a logical product of pixels shown in the form of a triangle (△) and a circle (○) (logical product (1)) and a logical product of pixels shown in the form of a black triangle ( ) and a circle (○) (logical product (2)) are first determined for each solid line, and a logical sum of the logical products (1) and the logical products (2) of all lines is then determined. A center pixel of the window of 13×13 pixels is judged as a feature-region if the result of the final logical operation is 1.

It is also possible to use a combination of both the detection patterns shown in FIGS. 14 and 15 in such a way that a center pixel of a window of 13×13 pixels is judged as a feature-region and is given a logical value of 1 if a match with any one of eight detection patterns is found.

Figures 16, 17A, 17B, 17C, 17D:
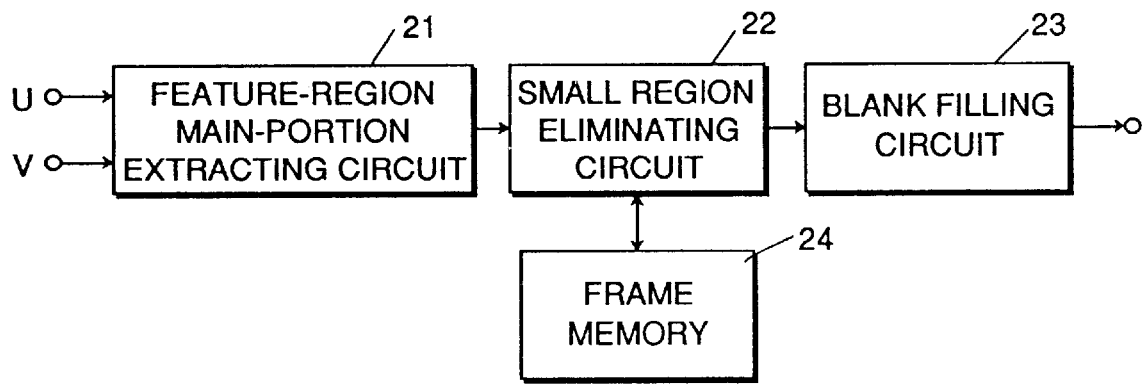
FIG. 16 shows another example of a feature-region extraction circuit, according to the present invention.
FIGS. 17A, 17B, 17C and 17D show detection patterns (2) for eliminating a small region, according to the present invention.

FIG. 16 shows another example (embodiment 2) of a feature-region extraction circuit according to the present invention, which comprises a feature-region main-portion extracting circuit 21, a small region eliminating circuit 22, a blank filling circuit 23 and a frame memory 24. The operation of this feature-region extraction circuit is as follows:

Similarly with the case of the embodiment of FIG. 4, the feature-region main-portion extracting circuit 21 extracts a skin-color region, occupying most of one's face-region. The extracted face-region, however, lacks different color regions such as the eyes, the eyebrows and the lips, and may include an region other than the face which was erroneously detected as a skin-color region because of a noise signal. Therefore, an extraction signal generated by the feature-region main-portion extracting circuit 21 is sent to the small region eliminating circuit 22 whereby a small region, erroneously extracted due to the effect of a noise signal, is eliminated from the extraction signal. The output of the small region eliminating circuit is stored to the frame memory 24 and a signal delayed by one frame is, returned to the small region eliminating circuit 22.

Figure 18:
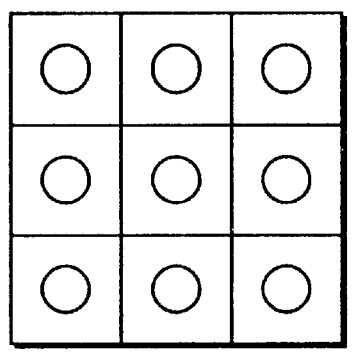
FIG. 18 shows detection patterns (3) for eliminating a small region, according to the present invention.
Figure 19A:
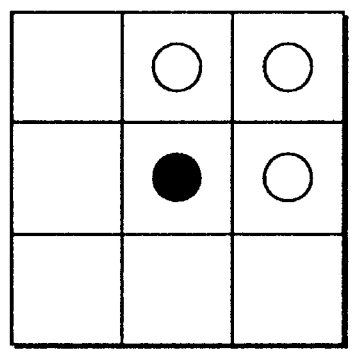
FIGS. 19A, 19B, 19C and 19D show a pattern (4) for judging a face-region of a preceding frame for eliminating a small region according to the present invention.
Figure 19B:
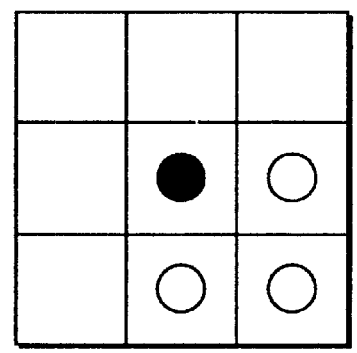
Figure 19C:
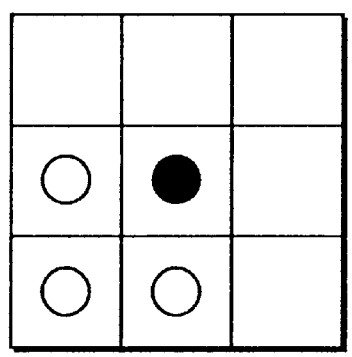
Figure 19D:
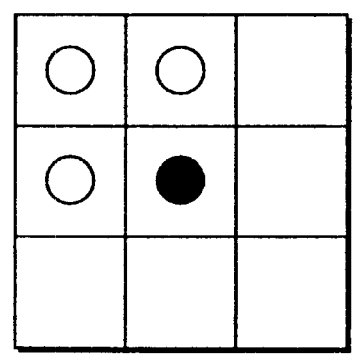

The small region eliminating circuit 22 may use detection Patterns shown in FIGS. 17A to 17D in the case an extraction signal delayed by one frame from the frame memory 24 is not a face-region and a detection pattern shown in FIG. 18 in the case the extraction signal delayed by one frame from the frame memory 24 is a face-region. In each the extraction signal delayed by one frame is not a face-region, a present extraction signal is compared with each of four detection patterns shown in FIGS. 17A to 17D and a center pixel of a window of 5×5 pixels is recognized as a region other than the face and is given a logical value of 0 when no match is found. In each of the detection patterns, a center pixel is recognized as a face-region when a logical product of 15 pixels shown in the form of a circle is 1.

On the other hand, in the case the extraction signal delayed by one frame is a face-region, a present extraction signal is compared with the detection pattern shown in FIG. 18 and a center pixel of a window of 3×3 pixels is recognized as a region other than the face and is given a logical value of 0 when no match is found. In this pattern, a center pixel is recognized as a face-region when a logical sum of 9 pixels shown in the form of a circle is 1.

Another example of detection patterns may be applicable in the small region eliminating circuit 22: The detection patterns shown in FIGS. 19A to 19D are used for an extraction signal delayed by one frame from the frame memory 24. In the case they do not match any one of 4 detection patterns shown in FIGS. 19A to 19D and is not recognized as a face-region, the detection patterns shown in FIGS. 17A to 17D are used as the detection patterns for the present extraction signal. On the other hand, in the case they match any one of 4 detection patterns shown in FIGS. 19A to 19D and is recognized as a face-region, the detection pattern shown in FIG. 18, is used as the detection pattern for the present extraction signal. In each of the detection patterns of FIGS. 19A to 19D, the extraction signal delayed by one frame is judged as a face-region when a logical product of 3 pixels shown in the form of a circle (○) is 1 or 1 pixel shown in the form of a black circle (●) is 1.

In the case the extraction signal delayed by one frame is not a face-region, a present extraction signal is compared with each of 4 detection patterns shown in FIGS. 17A to 17D and a center pixel of a window of 5×5 pixels is given a logical value of 0 as a region other than the face when no match is found. In this case, each pattern is used in such a way that the center pixel is recognized as the face-region when a logical product of 15 pixels, shown in the form of a circle, is 1.

On the other hand, in the case the extraction signal is a face-region, a present extraction signal is compared with the detection pattern shown in FIG. 18 and a center pixel of a window of 3×3 pixels is given a logical value of 0 a region other than the face when no match is found. This detection pattern is used in such a way that the center pixel is recognized as the face-region when a logical sum of 9 pixels, shown in the form of a circle, is 1.

These detection patterns provide a relaxed face-region criterion for the present extraction signal when the extraction signal delayed by one frame is a face-region. In short, a hysteresis characteristic is given to each face-region detection pattern for the present signal. This may increase the margin for noise to prevent the face-region from being extracted with flickers. The output signal of the small region eliminating circuit 22 enters the blank filling circuit 23 that, similarly to the case of the embodiment 1, fills in dropout regions (the eyes, the eyebrows, the lips and so on) of the face-region with different colors other than the face's skin-color.

The above-mentioned face-region extraction method eliminates the possibility of erroneously extracting any moving object other than the face-region. A face-region can be extracted exactly along its contour line, therefore the face-region extraction signal may withstand the adaptive processing of portions other than the face-region, for example, with a low-pass filter, assuring that the subjective image quality is not impaired by unnaturally emphasized boundaries. According to the present invention, it is possible to prevent a face-region from being distorted with flickers that are easily detected by human eyes. This feature may considerably improve the subjective image quality.

Although the above-described embodiment is used for extracting the face-region of an image, it can extract any kind of feature-region other than the face by changing the thresholds for color difference signals. The small region eliminating circuit can also use detection patterns having other sizes than the windows of 3×3 and 5×5 pixels or may work with other patterns having like effects. Similar effects can be obtained by giving a hysteresis characteristic to thresholds of the feature-region extraction circuit or to detection patterns of the blank filling circuit.

According to the present invention, it is possible to obtain the same effects as those of the small region eliminating circuit and the blank filling circuit even if either of these circuits is not provided.

The feature-region extraction method according to the present invention can extract a face-region with no flicker noise by giving a hysteresis characteristic to a face-region criterion depending upon whether a pixel of a frame backed by L frames (L is a positive integer) and/or its neighboring pixel is a feature-region or not.

FIG. 20 shows another example (embodiment 3) of a feature-region extraction circuit according to the present invention wherein a frame memory is indicated by numeral 31 and other components similar in function to those of FIG. 4 are given the same numerals.

The frame memory 31 generates a series of feature-region extraction signals of frame No. N (N is a positive integer), N−1, N−2, . . . N−M (M is a positive integer) through a memory of M frames (M is a positive integer). These feature-region extraction signals are weighted to get therefrom feature-region extraction signals $F_N$ weighted to be adoptively processed by pre-filtering or quantification control.

The weighted feature-region extraction signal $F_N$ is expressed as follows:

$$F_N = \Sigma a_{N-I} \cdot K_I$$

where $a_N$ indicates whether a feature-region extraction signal of a frame N relates to a face-region ($a_N=1$) or not ($a_N=0$: background region) and $K_I$ is a weight coefficient of a frame No. (N−I).

If M=3, $K_I$ can take, for example, any one of values (weight coefficient) shown in FIG. 21. In the case of the example (1) all of $K_0$ to $K_3$ are 1. In the case of the example (2) $K_0$ and $K_3$ are 1 and $K_1$ and $K_2$ are 2. In the case of the example (3), $K_o$ is 4, $K_1$ is 2, $K_2$ and $K_3$ are 1.

When a two-dimensional pre-filter for processing a luminance signal, a color difference signal has a coefficient shown in FIG. 22, a variable of adaptive control can take, e.g., values shown in FIG. 23A and 23B. FIGS. 23A and 23B show adaptive control variables respectively in the case of not-weighted or weighted control. FIG. 23B shows a case that a feature-region extraction signal $F_N$ is weighted as shown in the example (1) of FIG. 21. In case of the feature-region extraction signal $F_N$ being not-weighted, the coefficient P of the two-dimensional pre-filter is equal to 1 and a variation ΔQ of a quantizing step size is equal to +10 when the feature-region extraction signal $F_N$ is O, whereas P=8 and ΔQ=0 when the signal $F_N$ is 1. In case of the feature-region extraction signal $F_N$ being weighted, P=1 and ΔQ=+10 are obtained when the feature-region extraction signal $F_N$ is 0. P=2 and ΔQ=+5 are obtained when the signal $F_N$ is 1, P=4 and ΔQ=+2 when the signal $F_N$ is 2, P=8 and ΔQ=0 when the signal $F_N$ is 3, and P=8 and ΔQ=0 when the signal $F_N$ is 4.

According to the present invention, it is possible to use an output signal of the blank filling circuit 3 as a feature-region extraction signal to be adoptively processed with a pre-filter or by quantization control. Furthermore, it is also possible to put an output signal from the blank filling circuit 3 into the frame memory 31 and use an output signal of the frame memory 31 as a feature-region extraction signal.

Application of the weighted feature-region extraction signal may not impair the image quality even if the signal includes any erroneously detected portion. Noise may damage a feature-region extraction signal in such a way that a certain portion may be erroneously extracted with discontinuity of time. In such case, if adaptive control variables shown in FIG. 23A are used, P and ΔQ can considerably vary depending upon whether the feature-region extraction signal is 0 or 1, resulting in that the signal includes flicker portions thus impairing the image quality. On the contrary, if weighted adaptive control variables shown in FIG. 23B are used, the adaptive control variables vary smoothly as the feature-region extraction signal changes from 0 to 4. This may reduce the deterioration of the image quality.

The face-region extraction method according to the present invention eliminates the possibility of erroneously extracting any moving object other than the face. Since the face-region can be extracted exactly along its contour line, the face-region extraction signal may withstand the adaptive processing of a background region with a low-pass filter or/and by quantization control for roughening the quantization step size of the background region/thereby assuring not to impair the subjective image quality with an unnaturally emphasized boundary.

Although the above-described embodiment is used for extracting the face-region of an image, it can extract any kind of feature-region other than a face by changing the thresholds for color difference signals. It is also possible to perform a feature-region extraction by using luminance signals in combination with color difference signals or by using color signals such as R, G, B and so on. The windows with different sizes other than 3×3 and 13×13 pixels may be applicable with like effects for small region elimination and blank filling processing. The feature-region extracting method, according to the present invention, can realize the fine extraction of a feature-region on an image without a small region eliminating circuit.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalents of such metes and bounds are therefore intended to be embraced by the claims.

What is claimed:

1. A feature-region extraction and transmission circuit comprising:
    a feature-region main-portion extracting circuit extracting, from a color image of a moving object, an image region having feature color difference extraction signals indicative of a feature-region;
    a small region-eliminating circuit, which compares at least one feature color difference extraction signal with at least one predetermined detection pattern, and which eliminates a predetermined region of the at least one feature region difference extraction signal and produces an output signal; and
    a blank filling circuit, which receives the small region eliminating circuit output signal, and which fills in, with a different color, dropout regions which are enclosed within the feature-region, and which have color difference signals other than the feature color difference extraction signals.

2. The feature-region extraction and transmission circuit according to claim 1, wherein the feature-region main-portion extracting circuit further includes
    a first and second comparison circuits, each providing an output comparing a respective color difference signal with a predetermined upper limit threshold and a predetermined lower limit threshold, and
    an AND gate circuit deriving a logical product of the outputs of the comparison circuits, said logical product thereby extracting a common region in which the value of each said color difference signal falls between said lower limit threshold and said upper limit threshold.

3. A feature-region extraction circuit according to claim 1, wherein the feature-region main-portion extracting circuit further comprises:
    a first and second comparison circuits each providing an output comparing each color difference signal with a respective first predetermined upper limit threshold and a respective first predetermined lower limit threshold;
    a first AND gate circuit deriving a logical product of the outputs of the first and second comparison circuits and thereby extracting a first common region;
    a third and fourth comparison circuits each providing an output comparing each color difference signal with a respective second predetermined upper limit threshold and a respective second predetermined lower limit threshold;
    a second AND gate circuit deriving a logical product of the outputs of the third and fourth comparison circuits and thereby extracting a second common region; and
    an OR gate circuit, deriving a logical sum of outputs of said first and second AND gate circuits, thereby extracting a feature-region including both of said common regions.

* * * * *